Figure 1:
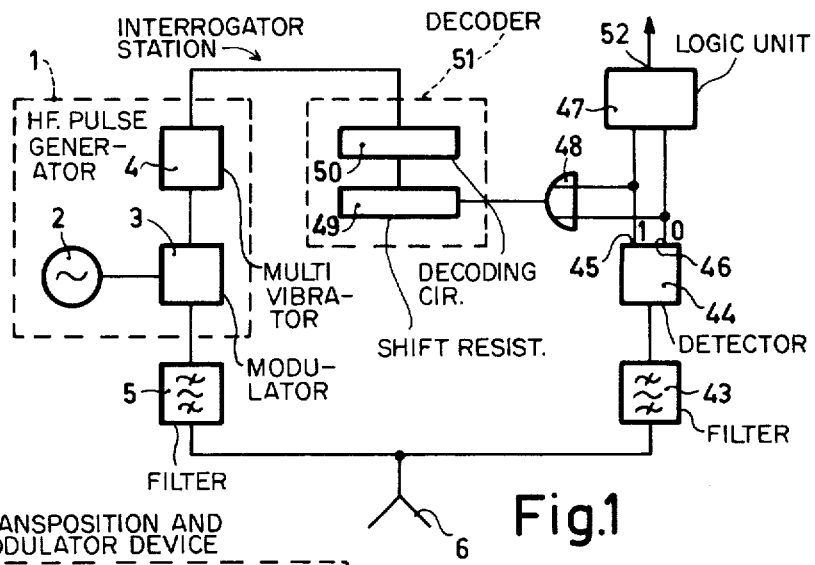

United States Patent [19]

Olsson

[11] 4,040,053
[45] Aug. 2, 1977

[54] TRANSPONDER SYSTEM FOR THE TRANSFER OF SIGNALLING INFORMATION FOR RAIL-BOUNDED VEHICLES

[75] Inventor: Kjell Olow Ingemar Olsson, Jarfalla, Sweden

[73] Assignee: U.S. Philips Corporation, New York, N.Y.

[21] Appl. No.: 605,528

[22] Filed: Aug. 18, 1975

[30] Foreign Application Priority Data

Aug. 16, 1974 Sweden .............................. 7410476

[51] Int. Cl.$^2$ .............................................. G01S 9/56
[52] U.S. Cl. ........................... 343/6.5 R; 246/122 R; 246/167 R; 343/6.8 R; 343/6.5 SS
[58] Field of Search ............. 246/7, 30, 122 R, 167 R; 343/6.5 R, 6.5 LL, 6.5 SS, 6.8 R, 6.8 LC, 7.5; 340/408

[56] References Cited

U.S. PATENT DOCUMENTS

| | | | |
|---|---|---|---|
| 3,246,322 | 4/1966 | Kuecken | 343/7.5 X |
| 3,255,900 | 6/1966 | Graham | 343/6.5 LC X |
| 3,341,845 | 9/1967 | Deman | 343/6.8 LC X |
| 3,891,963 | 6/1975 | Herbert, Jr. | 343/6.5 SS X |
| 3,914,762 | 10/1975 | Klensch | 343/6.8 LC X |

FOREIGN PATENT DOCUMENTS

1,591,511  5/1973  Germany ................ 343/6.5 SS

*Primary Examiner*—Stephen G. Kunin
*Attorney, Agent, or Firm*—Frank R. Trifari

[57] ABSTRACT

A transponder system with ensured synchronization for a railway signalling system, comprising an interrogating station, from which an interrogation signal is transmitted continuously, and a responder station which is energized in response to the interrogation signal and repeatedly retransmits a coded information reply signal to the interrogating station; synchronization is achieved, by starting each information transmission by means of a predetermined start signal generated in the interrogating station as a result of a predetermined bit sequence retransmitted from the responder station. In normal operation the bit sequence is generated immediately after the retransmission of a message or word and indicates the end of this message. At the start of operation when initially the inquiry station and reply unit have bad coupling to each other, the predetermined bit sequence is generated when the amplitude of the interrogating signal received in the responder station exceeds a certain threshold level for starting-up the system.

3 Claims, 2 Drawing Figures

TRANSPONDER SYSTEM FOR THE TRANSFER OF SIGNALLING INFORMATION FOR RAIL-BOUNDED VEHICLES

The invention relates to a transponder system for the transfer of signal information for rail-bounded vehicles comprising an interrogator station and a passive responder station, said interrogator station is provided with a pulse generator for the continuous transmission of a pulsed interrogation signal with a given carrier frequency, said responder station is provided with a frequency transposition device for the transposition of received pulses with the given carrier frequency to a harmonic of this frequency, with a modulator coupled with the transposition device, and an information source coupled to the modulator for the modulation of the frequncy transposed pulses in accordance with the information to be transmitted to the interrogation station whereby the interrogator station is provided with a detector for the detection of received frequency transposed pulses.

Such a transponder system is of general knowledge. A problem in such a system is that rail-bounded vehicles generate a large number of high level interference signals. To obtain a transfer of correct information it is an absolute requirement that synchronization be obtained between the interrogator and passive transponder station during the transfer of information.

The invention has for its object to provide a cheap and very simple transponder system, with a safe and improved information transfer by means of excellent synchronization, which system comprises a minimum of components.

The transponder system according to the invention is characterized in that the information source is coupled via a switching circuit to the modulator, the responder station is provided with a code generator coupled via the switching circuit to the modulator for the transmission of a continuous sequence of predetermined modulated reply pulses in response to received interrogation pulses, the interrogation station is provided with a decoder connected to the detector for the identification of an uninterrupted sequence of a predetermined number of said modulated reply pulses, whereby the decoder is coupled with the pulse generator for the insertion of a specific starting signal in the interrrogation signal after the detection of the predetermined number of modulated reply pulses, and the responder station is provided with a start signal detector coupled to the switching circuit for the transmission of a reply pulse sequence modulated in accordance with the information to be transmitted in response to the detection of a starting signal.

Figure 2:
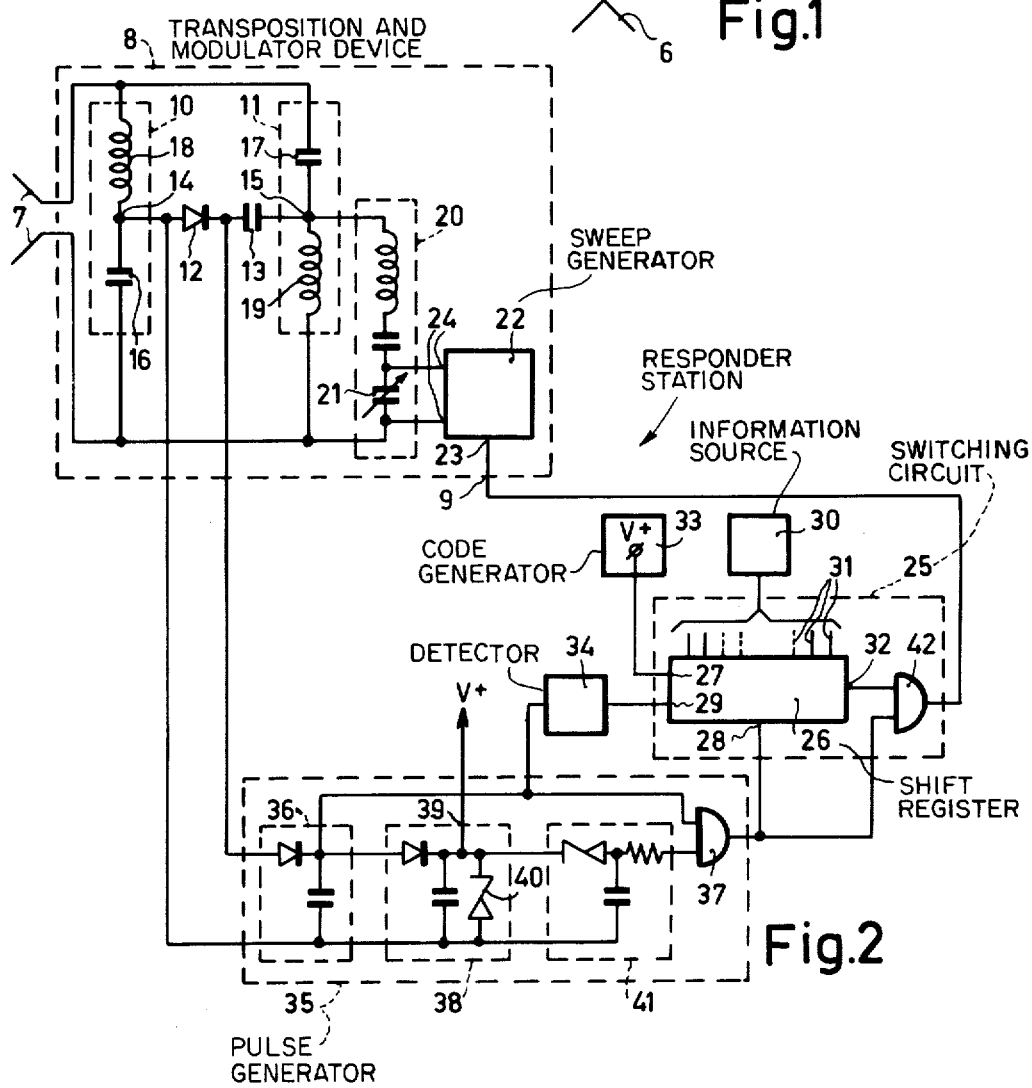

The invention and its advantages will be further explained with reference to the embodiments shown in the Figures in which:

FIG. 1 shows a block diagram of an interrogator station of a transponder system owing to the invention and FIG. 2 shows a responder station of a transponder system owing to the invention.

The transponder system is provided with an interrogator station shown in FIG. 1 and a responder station shown in FIG. 2. The responder station is assumed to be mounted stationary along a railway line and the interrogator station is assume to be mounted on a locomotive passing the responder station and to which information, for example relating to maximum speed, stop etc., shall be transmitted.

The system operates with a high frequency signal as interrogation signal, which is generated by a high frequency pulse generator, included in the interrogator station shown in FIG. 1. A high frequency signal is generated by an oscillator 2, having a frequency $f_0$, suitably within the microwave range. This high frequency signal is modulated to pulse shape by a modulator 3, e.g. a switch. The switch is opened and closed alternatingly in a rhythm, whch is determined by a multivibrator 4. Each time the switch 3 closes, power will be led from the oscillator 2 to a filter 5, which will suppress frequencies, if any, lying outside $f_0$, and further to an antenna 6 for being transmitted towards the responder station. The oscillator 2 and the multivibrator 4 operate continuously so that a pulsed interrogation signal is transmitted continuously, in which for example the pulse length is equal to the pulse gap.

When a responder station comes within the reach for the interrogation signal will be received by an antenna 7 (see FIG. 2) and led to a device 8 comprising a frequency transposition device and modulator, in which the frequency of the interrogation signal carrier is e.g. doubled. These transferred interrogation signal pulses are furthermore modulated with information to be transmitted, which information is received at a control terminal 9. This modulated pulse signal is retransmitted to the interrogation station at the doubled carrier frequency $2f_0$. The transposition and modulator device 8 can be of the kind as described in the U.S. patent application Ser. No. 594,206 of the applicant. In particular the transposition device as shown in FIG. 2, comprises two series resonant circuits 10 and 11 connected in parallel and coupled to the antenna 7 and a series circuit consisting of a diode 12 and a capacitor 13 connected between the junctions 14 and 15 between capacitance 16; 17 and inductance 18;19 in the two resonant circuits 10 and 11. The resonant circuit 10 is closely tuned to the incoming frequency $f_0$ and the resonant circuit 11 is closely tuned to the selected harmonic $2f_0$. The modulator is provided with a series resonant circuit 20 comprising a variable capacitance, 21 e.g. realised varactor, which series resonant circuit 20 is parallelly connected to an element, e.g. indutance 19, of the resonant circuit 11. The modulator is further provided with a sweep generator 22 having a control input 23 coupled to the control input 9 of device 8. The output 24 of the sweep generator 22 is connected to the varactor 21.

The operation is as follows.

When an interrogation pulse is received, the first resonant circuit 10 starts oscillation. By the nonlinear characteristic of diode 12 the second resonant circuit 11 starts oscillation too. The so obtained frequency transposed pulse signal is retransmitted by the antenna 7. When this pulse signal has to be modulated a D.C. signal is fed to the control input 9, as will be described later on. This D.C. signal is fed to the control input 23 of the sweep generator 22. In response to this signal the sweep generator 22 applies via output 24 a linear increasing to the varactor 21. The frequency of the resonant circuit 20 is swept by this voltage through frequency band comprising the frequency $2f_0$. When the frequency of the resonant circuit 20 is equal to $2f_0$, the resonant circuit 11 is damped, by which the retransmitted pulse is provided with a dip.

The pulse fed to the control input 9, which determines the modulation of the retransmitted pulses are delivered by a switching circuit 25 which is provided with a shift register 26, which has a series input 27, a shift pulse or clock pulse input 28 and a parallel control input 29. The information to be transmitted is fed from an information source 30 to the shift register 26 in the shape of DC voltages, which can be of high or low value and which voltages are fed to a number of parallel inputs 31. The information DC voltages can be generated in any suitable manner e.g. as decribed in the U.S. patent application, Ser. No. 561,190 of applicant. When a control pulse is fed to the input 29 all voltages at the inputs 31 are instantaneously transferred to the respective stages in the register 25 and will set the stages in a condition corresponding to the applied voltage. Clock pulses at the input 28 will in conventional manner produce shifting of the content in the register 26, so that the information represented by the contents of the stages will successively be fed-out at the output 32 of the last stage. A code generator 33 is connected to the series input 27. This code generator 33 is in the given example a D.C. source with high potential, whereby upon shifting of the shift register 26 always a binary one will be written into this register 26. The control pulse on the input 29, which in known manner produces parallel feeding-in of the information respresented by the voltages at the input 31, is obtained from a start signal detector 34 to be described more closely in the following.

The clock pulses and the required DC voltages are derived from the diode 12 included in the device 8. A portion of the power in the current pulses through the diode 12 is therefore extracted and led to a clock pulse generator 35 comprising a detector circuit 36, which produces high frequency detection of the pulses. From the circuit 36 DC voltage pulses will be obtained in rhythm with the interrogation pulses from the interrogating station. These DC voltage pulses are used as clock pulses in the responder station and are led to an AND-gate 37 having its output connected to the clock input 28 of the shift register 26. The DC voltage pulses from circuit 36 are also led to a rectifying stage 38, which will smooth the pulses to a continuous DC voltage. The continuous voltage $V_+$ apearing at the output 39 of stage 38, which voltage is limited in amplitude by means of a zener diode 40 is led to all components in the responder unit, which require supply voltage. The voltage from the rectifying stage 38 is furthermore led to a threshold circuit 41, which delivers its output voltage to a second input of the gate 37. At a level on the voltage from the rectifying stage 38, which is below the threshold value in the circuit 41, this circuit will deliver voltage 0 to the gate 37, which keeps this gate 37 closed. When the voltage from stage 38 exceeds the threshold, the voltage will pass through the threshold circuit 41 to the gate 37 and will open this gate 37. The clock pulses from the detector circuit 36 then will pass through the gate 37 and produce shifting of the content in the register 26. The pulses, which are successively shifted out from the last stage in the shift register 26, will pass to a pulse-shaping AND-gate 42 in the switching circuit 25. At a second input of this gate 42 clock pulses from gate 37 are fed. The pulses from gate 42 are finally led to the control input 9 of the device 8 for modulating the retransmitted pulses in accordance with the information obtained from the switching circuit 25.

The function of the part of the responder system discribed so far is as follows.

Before information is transmitted a pulsed interrogatin signal is transmitted continuously from the interrogator station. When a responder station approaches the interrogator station and comes within the reach for the interrogating pulse signal, clock pulses will be generated in the clockpulse generator 35 in the responder station and a DC voltage starts to be built up in the rectifying stage 36. The clock pulses are, however, blocked by the gate 37 and no shifting of the shift register 26 occurs. The voltage at the control input 9 of the device 8 is constant whereby a modulation of the retransmitted pulses occurs, which modulation corresponds to the binary digit 0. The retransmitted pulse response in this moment will thus correspond to a row of zeros.

When the interrogator station and responder station have approached each other further the voltage at the output of the rectifying stage 38 will be so high that the threshold in the threshold circuit 4 will be exceeded. The clock pulses then will be fed to the shift register 26. After a number of shifts only ones are recorded in the register 26 and these ones are fed to the control input 9 of the device 8. After only having retransmitted pulses with zero information content in a first time period in reply unit starts to retransmit pulses with "ones" information content. This gives the information to the interrogating station that a responder station has come within the range for the interrogating signal and that the transmission is so effective that information transfer can begin.

The reply pulses are received by the antenna 6 and led to a filter 43, which is tuned to the frequency $2f_0$. From this filter 43 the pulses are led to a detector 44, which determines if incoming pulses have a "zero" or a "one" information content. Pulses representing binary one are led to a separate output 45 and pulses representing binary zero to another output 46. The pulses from the dectector 44 are the led to a logic unit 47 for evaluation of the information.

The pulses from the detector 7 are also led through an OR-gate 48 to a decoder 51 comprising a shift register 49 and a decoding circuit 50. The shift register 49 is shifted in rhythm with incoming pulses and will thus have a content, which in each moment corresponds to the information in a number of the immediately preceeding reply pulses. The decoder circuit 50 is in the case sensitive for the condition in the register 49, in which a predetermined number of stages, for example eight stages, has an information corresponding to binary one. When this occurs the decoder 51 will deliver a control signal to the multivibrator 4 in the pulse generator. When the multivibrator 4 receives a control signal from the decoder 51 it will produce a change in its transmitted pulse pattern, which change is a start order for the responder station and will be called a start signal. The change in the pulse pattern is assumed to consist therein that upon reception of a control signal from the decoder 51 the transmitted pulse will be extended and comprise two normal pulse periods plus the intermediate pulse gap. Alternatively the start signal may consist therein that a pulse in the normal pulse flow is suppressed.

This change in the transmitted pulse pattern, which represents the start signal, will also appear in the clock pulse signal generated by the detector circuit 36 in the clock pulse generator 35 in the transponder station and will be detected by the start signal detector 34. This detector 34 may be a re-triggerable monostable flip-flop having such a long worktime that it is continuously set by the normal clock pulse flow of the interrogating signal. However, when the said extended pulse arrives, representing the start signal, the flip-flop will return approximately after half the enlarged pulse period and will be triggered again at the rear flank of the start signal pulse. At the triggering and the setting of the monostable flip-flop a control pulse will be generated, which is led to the control input 29 of the shift register 26. Then all inputs 31 will for a short time be connected to the respective stage in the shift register and the information, which is represented by the voltages at the said inputs, will be written immediately into the register 26. Directly thereafter the information starts to be shifted-out by the clock pulses at the shift input 28.

To obtain continuous opertion, the stages of the shift register 26 are filled with information from the code generator 33, by shifting the information from the information source 30 out of the shift registor 26. The operation as described before is then repeated, and so on.

Each time an information signal is detected and recognised by the logic unit 47, this information is stored. After a number of such received information signals the logic unit takes a majority descision and sends the information content via output 52 to a not shown device which will take action in accordance with this information.

In order to enable discovery of synchronization errors in the responder station within the register 26 itself, for example caused by missed clock pulses in one or more stages, control bits can be introduced into the message. A proposed pattern of control bits is as follows.

Assume that a message consists of 24 bits and the register 26 thus comprises 24 stages for the information to be transmitted. According to the proposal two additional stages can be introduced after the 8th stage, into which additional stage control bits are written. After the 16th stage of the information containing part of the register two further additional stages for control bits can be introduced etc. The control bits are written into the register 26 simultaneously with the information to be transmitted. The control bits content can be changed from time to time and can furthermore have different content in the different control bit groups. Thus the control bits in the two first additional stages consist in a given example of two zeros, while the control bits in the next pair of additional stages are two ones. At the next transmission of the message the control bits are interchanged so that the first pair of additional stages will get two ones and the second pair of additonal stages will have two zeros. Hereby synchronization errors, for example a cyclically repeated error caused by a missed clock pulse, can not arise which is not discovered at the interrogator station.

If the shift register 26 is divided into a number of sub registers these control bits can suitably be written into additional stages, which are arranged between the sub registers. In this case the control bits have in particucalar for their purpose to enable discovery of errors in the mutual synchronization between the subregisters due to a missed clock pulse in any of the registers. The number of control bits may be arbitrary and the character combination formed by the control bits can also be arbitrary. For a good function it is, however, essential that the content in the control bit groups is changed from time to time. In that case the logic unit 47 in the interrogation station has to be adapted in a known manner to detect faulty reply signals.

What is claimed is:

1. A transponder system for the transfer of signalling information for rail-bounded vehicles comprising an interrogator station and a passive responder station activated by the energy of a signal received from said interrogator station, said interrogator station being provided with a pulse generator for the continuous transmission of a pulsed interrogation signal with a given carrier frequency, said responder station being provided with a frequency transposition device for the transposition of received pulses with the given carrier frequency to a harmonic of this frequency, with a modulator coupled with the transposition device, and an information source coupled to the modulator for the modulation of the frequency transposed pulses in accordance with the information to be transmitted to the interrogation station whereby the interrogator station is provided with a detector for the detection of received frequency transposed pulses, said information source being coupled via a switching circuit to the modulator, the responder station being provided with a code generator coupled via the switching circuit to the modulator for the transmission of a continuous sequency of predetermined modulated reply pulses in response to received interrogation pulses, the interrogation station being provided with a decoder connected to the detector for the identification of an uninterrupted sequence of a predetermined number of said modulated reply pulses, whereby the decoder is coupled with the pulse generator for the insertion of a predetermined starting signal in the interrogation signal after the detection of the predetermined number of modulated reply pulses, and the responder station being provided with a start signal detector coupled to the switching circuit for the transmission of a reply pulse sequence modulated in accordance with the information to be transmitted in response to the detection of a starting signal.

2. A transponder system as claimed in claim 1, wherein the switching circuit is arranged to couple the code generator to the modulator immediately after and information signal has been transmitted for the transmission of the continuous sequence of predetermined modulated reply pulses.

3. A transponder system as claimed in claim 1, wherein the switching circuit comprises a shift register and a clock pulse generator connected to a a shift pulse input of te shift register for generating clock pulses from received interrogating pulses to control the shift of that shift register and the code generator comprises a DC voltage source connected to a series input of the shift register for delivering at an output of this shift register a sequency of control pulses the modulator to form an uninterrupted sequence of reply pulses, and that the information source is connected to parallel inputs of the shift register and the start signal detector is connected to a control input of the shift register for writing the information from the information source in the shift register in response to a detected start signal which information is shifted to the output under the control of the clock pulses for modulating the reply pulses in accordance with the information signal.

* * * * *